United States Patent
Kessick et al.

[11] 3,898,251
[45] Aug. 5, 1975

[54] EPOXY RESIN CURING AGENT

[75] Inventors: Michael Arthur Kessick, Houston, Tex.; Ian Hugh McEwan, Mississauga, Canada

[73] Assignee: Canadian Industries Limited, Montreal, Canada

[22] Filed: Mar. 5, 1973

[21] Appl. No.: 337,751

[30] Foreign Application Priority Data
Mar. 3, 1972  United Kingdom............... 9977/72

[52] U.S. Cl. ........... 260/404.5; 260/31.2; 260/31.4; 260/33.6
[51] Int. Cl.² .......................................... C08K 5/16
[58] Field of Search ................................ 260/404.5

[56] References Cited
UNITED STATES PATENTS

| | | | |
|---|---|---|---|
| 3,383,397 | 5/1968 | Milks et al. ......................... | 260/404 |
| 3,409,590 | 11/1968 | Landua et al. ............. | 260/404.5 X |
| 3,409,591 | 11/1968 | Landua et al. ............. | 260/404.5 X |
| 3,409,592 | 11/1968 | Landua et al. ............. | 260/404.5 X |
| 3,467,684 | 9/1969 | Lane ................................ | 260/404.5 |

Primary Examiner—Ethel G. Love
Attorney, Agent, or Firm—Joan M. Noonan

[57] ABSTRACT

A curing agent for epoxy resins, a process for curing the epoxy resins using the curing agent and curable or cross-linkable compositions comprising the curing agent and the epoxy resins are described. The curing agent comprises the reaction product of 4,4'-diaminodiphenylmethane and the glycidyl ester of "Versatic" acid (a mixture of saturated, highly branched, mainly tertiary monocarboxylic acids having $C_9$, $C_{10}$, $C_{11}$, chain lengths). The curing agent and epoxy resin are intimately mixed together and allowed to cure at a temperature ranging from room temperature to a temperature up to 150°C. The reaction product or adduct used as the curing agent permits the use of a particularly successful curing agent, 4,4'-diaminodiphenylmethane which is normally too viscous and too slow to cure to be mixed with epoxy resins.

3 Claims, No Drawings

EPOXY RESIN CURING AGENT

This invention relates to new curing agent for epoxy resins, to a process for curing the epoxy resins using the curing agents and to curable or crosslinkable compositions comprising the epoxy resins and the curing agents.

Epoxy resins have found great utility in the manufacture of coating compositions, adhesives, moulding compounds and the like. These epoxy resins contain a number of reactive functional groups and are obtained by reaction of a polyhydric material with a compound containing both an epoxy group and a hydroxyl-reactive function. The resulting substantially linear condensation products may be further reacted by means of a variety of crosslinking agents to produce rigid, three-dimensional lattices. Usually the epoxy resins of this type are formed from epichlorohydrin and bis-(4-hydroxyphenyl)propane, the latter being known in bisphenol A.

One of the most successful class of curing or crosslinking agents for the above epoxy resins are aromatic amines. Of this class, methylene dianiline or, more correctly, 4,4'-diaminodiphenylmethane has been found to be superior for certain applications wherein the comparative insensitivity to heat of the final resins is important. However, this particular amine does have its drawbacks. The substance is a crystalline material melting at about 85°C.; consequently it cannot be mixed with epoxy resins or their solutions with ease. Attempts have herefore been made to circumvent these problems by preparing eutectic mixtures of methylene dianiline with other aromatic amines, e.g. phenylene diamine. However, these mixtures are alleged to react slowly at low temperatures.

According to the present invention, there is provided a novel curing agent for epoxy resins which comprises the reaction product of 4,4'-diaminodiphenylmethane and the glycidyl ester of Versatic acid (a mixture of saturated, highly branched, mainly tertiary monocarboxylic acids having $C_9$, $C_{10}$, $C_{11}$ chain lengths).

The invention also provides a composition which comprises, in intimate admixture, an epoxy resin having at least one reactive epoxy group

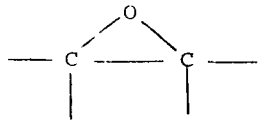

and as the hardener therefor, the reaction product of 4,4'-diaminodiphenylmethane and the glycidyl ester of Versatic acid.

The epoxy resins which may be cured by the novel hardening or curing agent of this invention include those resinous compounds containing a plurality of epoxy groups, i.e.

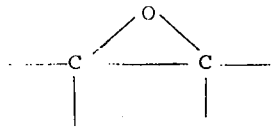

groups. These compounds may be aliphatic, cycloaliphatic, aromatic or heterocyclic and be substituted, if desired, with, for example, chlorine atoms, hydroxyl groups, ether groups and the like. They may also be monomeric and polymeric. Preferred are those products obtained by reaction of a polyhydric phenol with a halogen-containing epoxide or dihalohydrin e.g. by reaction of a dihydric phenol with epichlorohydrin in an alkaline medium. The resulting compounds are epoxy polyethers of polyhydric phenols. Examples of polyhydric phenols are resorcinol, catechol, hydroquinone, methyl resorcinol or polynuclear phenols such as 2,2-bis(4-hydroxy-phenyl) propane (bisphenol A), 2,2-bis(4-hydroxy-phenyl) butane, 4,4'-dihydroxybenzophenone, bis(4-hydroxy-phenyl) ethane, 2,2-bis(4-hydroxyphenyl) pentane, 5-dihydroxynaphthalene and novolac-type resins derived from the condensation of formaldehyde and phenols, cresols, substituted phenols, etc. The halogen-containing epoxides may be exemplified by 3-chloro-1,2-epoxybutane, 3-bromo-1,2-epoxyhexane, 3-chloro-1,2-epoxyoctane and the like.

Preferred epoxy resins include "Epon" 812 (Trade Mark) which is a diglycidyl ether of glycerol, Epon 826 (Trade Mark) which is a substantially pure diglycidyl ether of bisphenol A, Epon 828 (Trade Mark) which is a slightly resinified form of Epon 826 and "Genepoxy" M205 (Trade Mark) which is a modified diglycidyl ether of bisphenol A.

In order to achieve best results with the compositions of this invention, it is preferred to combine the curing agent and the epoxy resin in ratios of equivalents ranging from 0.9 to 1.5, preferably 0.95 to 1.2. The preferred combination of ingredients for curing agent is to mix the glycidyl ester of Versatic acid with the 4,4'-diaminophenylmethane in ratios of equivalents ranging from 0.90 to 1.5, most preferably from 1.0 to 1.2.

According to a final feature of this invention, there is provided a process for curing an epoxy resin as hereinbefore defined which comprises forming an intimate admixture of the curing agent as hereinbefore defined with the epoxy resin and allowing the admixture to cure at a temperature ranging from room temperature to about 150°C., e.g. at room temperature for a period of from 16 to 24 hours or at higher temperatures of up to 150°C. for periods of up to 3 hours.

The curing agent of this invention is prepared by mixing the 4,4'-diaminodiphenylmethane and the glycidyl ester of Versatic acid and heating the mixture. The heating is preferably kept at temperatures under 150°C., since higher temperatures lead to darkening of the mixture and high viscosity. Preferably, the heating is carried out under inert gas. The resulting reaction product is a viscous liquid which can be readily mixed with epoxy resin to cure them.

When the curing agent is mixed with an epoxy resin and this mixture is to be used in a coating composition, the viscosity of the adduct may be too high for such use. In such a circumstance, it is advantageous to dilute the adduct to lower the viscosity to between V-$Z_2$ Gardner-Holdt. To obtain this viscosity at 80–86% solids, there should be used diluents having a solubility parameter δ around 8.5 to 9.5 with medium hydrogen bonding potential viz at 25°C. The following is a list of suitable diluents which fulfill these requirements.

| Solvent | Viscosity Gardner-Holdt measured at 25°C. | Solubility Parameter |
|---|---|---|
| Toluene | V-W | 8.93 |
| n-Hexil Acetate | W-X | 8.64 |
| 2-Ethylhexanol | $Z_2$ | 10.1 |
| Cellosolve Acetate | X | 9.35 |
| Butyl Cellosolve | Y | 9.87 |
| Ethyl Acetate | P-Q | 8.91 |
| Ethylene Diacetate | W | 10.3 |
| Xylene | X | 9.1 |

Occasionally, the intimate admixture of the curing agent and the curable epoxy resin is also too viscous. In such a circumstance, a diluent selected from those described above may be included in the admixture.

In order to accelerate the cure of the epoxy resins, conventional accelerator catalysts may be used. Examples of such catalysts are N,N-dimethylbenzylamine, tridimethylaminomethylphenyl and the like.

Various other ingredients may be mixed with the epoxy resins subjected to cure with the novel adduct of this invention including pigments, fillers, dyes, plasticizers, resins and the like.

The curable mixtures of this invention may be used as adhesives, moulding compounds, coating compositions and laminating agents. The mixtures show excellent adhesion to glass, steel and concrete surfaces. In the following Example there are illustrated the various embodiments of the present invention.

EXAMPLE

Preparation of Curing Agent

A mixture of 50 g. (0.25 mole) of 4,4'-diaminodiphenylmethane and 62 g. (0.25 mole) of the glycidyl ester of Versatic acid was heated carefully to 90°C. The exotherm took the temperature to 130°C., and after 30 minutes, the temperature rose to 150°C. and was held for 60 minutes to ensure full reaction. The mixture was then cooled. The resulting adduct had a viscosity of 700 poises at 22°C. and a colour 8-9 Hellige.

Cure of Epoxy Resin

A mixture of 60 g. of Epon 828 (85% by weight in xylene) and 40 g. of the above-prepared curing agent (86% by weight in ethylene acetate) was prepared. A second mixture comprising the above mixture with 2 g. of tridimethylaminomethylphenol was prepared. A third mixture comprising the first mixture and 2 g. of N,N-dimethylbenzylamine was also prepared. Films of each of the above mixtures were drawn down using a 5 mil doctor blade on clean cold rolled steel. The films were then allowed to cure and the following data recorded.

| Cure | | First Film | Second Film | Third Film |
|---|---|---|---|---|
| Room Temp. 77°F. | 6 hrs. | Nil | Very slight tack | Hard tough |
| | 24 hrs. | Slight tack | Slight blocking | Complete cure |
| | 48 hrs. | Slight blocking | Complete cure | |
| | 72 hrs. | Complete cure | | |

-Continued

| Cure | | First Film | Second Film | Third Film |
|---|---|---|---|---|
| 140°F. | 90 min. | Some blocking | Slight blocking | Very slight blocking |
| 300°F. | 30 min. | Complete cure | | |

What we claim is:

1. The reaction product of 4,4'-diaminodiphenylmethane and the glycidyl ester of a mixture of saturated, highly branched, mainly tertiary monocarboxylic acids having $C_9$, $C_{10}$, $C_{11}$ chain lengths, obtained by heating said reactants to a temperature under 150°C, said reaction product being in the form of a liquid.

2. A product as claimed in claim 1 wherein the ratio of the quantity of glycidyl ester of the acid mixture to the quantity of 4,4'-diaminodiphenylmethane is in the range of from 0.90 to 1.5.

3. A product as claimed in claim 2 wherein the ratio is in the range of from 1.0 to 1.2.

* * * * *